(12) United States Patent
Teng

(10) Patent No.: US 8,095,943 B2
(45) Date of Patent: Jan. 10, 2012

(54) SLOT-IN OPTICAL DISK DRIVE

(76) Inventor: Hung-Chi Teng, Taichung (TW)

(*) Notice: Subject to any disclaimer, the term of this patent is extended or adjusted under 35 U.S.C. 154(b) by 438 days.

(21) Appl. No.: 12/430,413

(22) Filed: Apr. 27, 2009

(65) Prior Publication Data

US 2010/0275223 A1 Oct. 28, 2010

(51) Int. Cl.
*G11B 17/04* (2006.01)
(52) U.S. Cl. .............................. 720/620; G9B/17.013
(58) Field of Classification Search ............... 720/620; G9B/17.013
See application file for complete search history.

(56) References Cited

U.S. PATENT DOCUMENTS

2004/0163094 A1* 8/2004 Matsui et al. ............... 720/650
2007/0079311 A1* 4/2007 Kimura et al. .............. 720/613

* cited by examiner

*Primary Examiner* — Hoai V Ho
(74) *Attorney, Agent, or Firm* — Chun-Ming Shih

(57) ABSTRACT

A slot-in optical disk drive includes a holding mechanism, a main body and a sliding module. The holding mechanism includes a disk slotting opening, two sliding rails and two slope rails. The main body and the sliding module are held by the holding mechanism. The main body includes a shelf, a disk reading unit and a main spindle motor. The sliding module includes a sliding base, two clamp sheets and a driving unit, each clamp sheet having a pivot end, a free end opposite to the pivot end and a sliding block. If the sliding block is at the sliding rail, the free end of the clamp sheet and the sliding base are closed up; and if the sliding block is at the slope rail, the free end of the clamp sheet and the sliding base are opened up.

6 Claims, 10 Drawing Sheets

SLOT-IN OPTICAL DISK DRIVE

BACKGROUND

1. Technical Field

The present invention relates to an optical disk drive, and more particularly to a slot-in optical disk drive.

2. Description of the Related Art

In recent years, an optical disk drive mainly uses an access mechanism to permit insertion and ejection of a disk. When the disk is required to use, the access mechanism may load the disk to a main body of the optical disk drive, and when the disk is required to withdraw or be replaced, the access mechanism may withdraw the disk. Referring to FIG. 9, typically, a conventional slot-in optical disk drive includes a holding mechanism 91, a main body 92, a sliding module 93, two clamp sheets 94 located above the sliding module 93, and a magnetic unit 95 disposed between the sliding module 93 and the clamp sheets 94. The disk can be carried to the main body 92 in the holding mechanism 91 by the sliding module 93 cooperative with the magnetic unit 95 to clamp the disk. However, in this magnetic manner of clamping the disk, the disk is clamped by a magnetic force, and if the disk is required to withdraw, it is necessary that another force is used to resist the magnetic force. That would consume a relatively high power. Consequently, a motor with the high power is needed, and thus a relatively high electric energy would be consumed. In addition, a magnet in the magnetic unit 95 is needed and the motor with the high power is needed to resist the magnetic force, so equipment investment and cost of the above slot-in optical disk drive would be relatively high.

BRIEF SUMMARY

The present invention relates to a slot-in optical disk drive that can save electricity and reduce cost.

A slot-in optical disk drive includes a holding mechanism, a main body and a sliding module. The holding mechanism includes a disk slotting opening defined in a front end thereof, two sliding rails at two inner sidewalls on two sides thereof correspondingly, and two slope rails sloped up from ends of the sliding rails correspondingly. The main body is held by the holding mechanism, and includes a shelf, a disk reading unit and a main spindle motor, the disk reading unit and the main spindle motor disposed on the shelf. The sliding module is held by the holding mechanism, and includes a sliding base, two clamp sheets and a driving unit for moving the sliding base, each clamp sheet having a pivot end, a free end opposite to the pivot end and a sliding block, the pivot end configured on the sliding base rotatably, the free end facing the disk slotting opening, the sliding block disposed on the free end, the sliding block being movable along the sliding rails and the slope rails. If the sliding block is at the sliding rail, the free end of the clamp sheet and the sliding base are closed up; and if the sliding block is at the slope rail, the free end of the clamp sheet and the sliding base are opened up.

When compared to the conventional art, the slot-in optical disk drive of the present invention does not use a magnetic unit to clamp a disk, so cost of the magnetic unit can be saved; furthermore, a component that is used to generate a force to resist the magnetic force can be omitted; and thus, the cost and power consumption of the slot-in optical disk drive of the present invention can be reduced.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
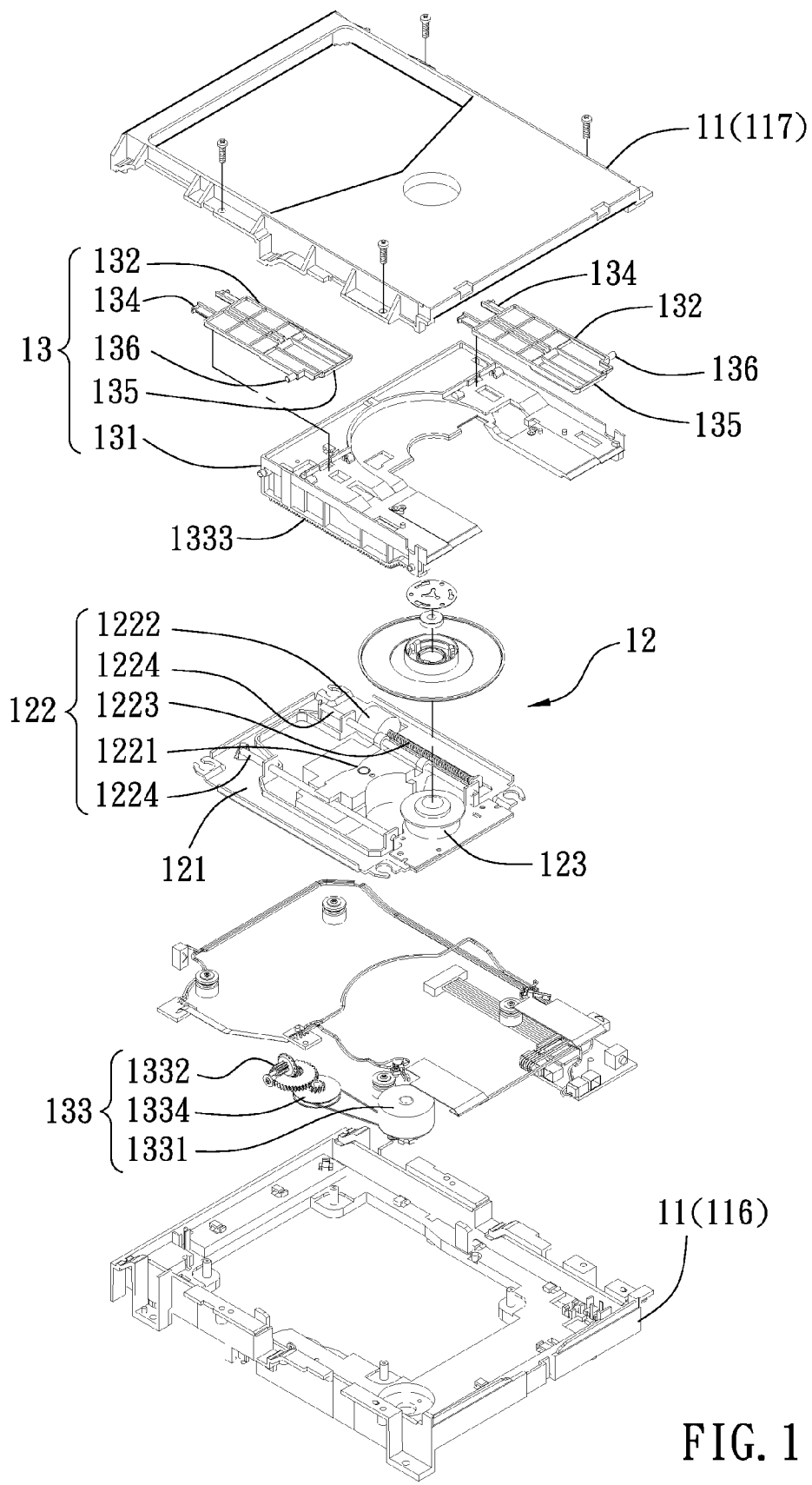
FIG. 1 is a schematic, exploded view of a slot-in optical disk drive according to an embodiment of the present invention.
Figure 1A:
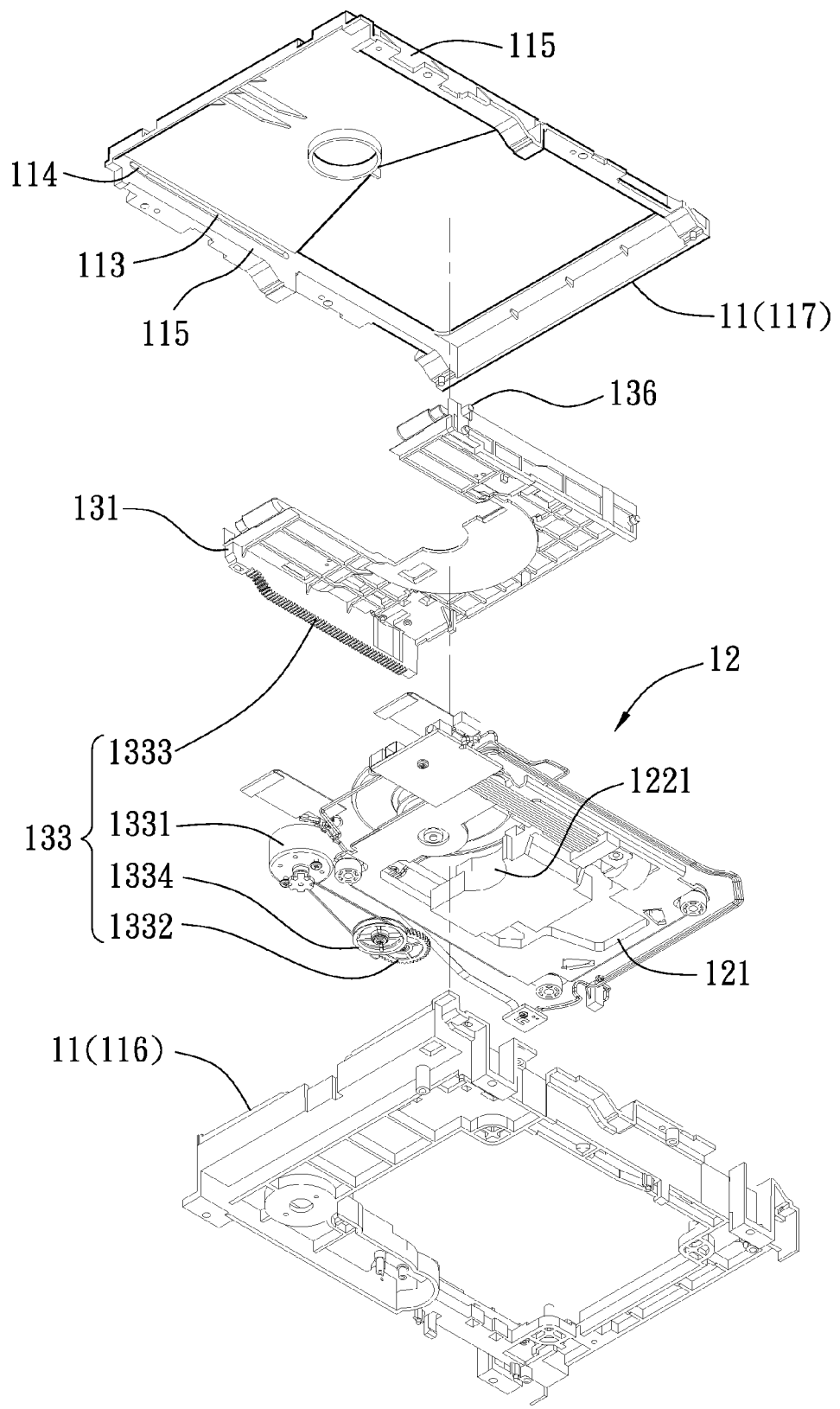
FIG. 1A is a schematic, exploded view of the slot-in optical disk drive according to the embodiment of the present invention, as seen from another aspect.

Referring to FIGS. 1 and 1A, a slot-in optical disk drive according to an embodiment of the present invention is shown. The slot-in optical disk drive mainly includes a holding mechanism 11, a main body 12 and a sliding module 13.

Figure 2:
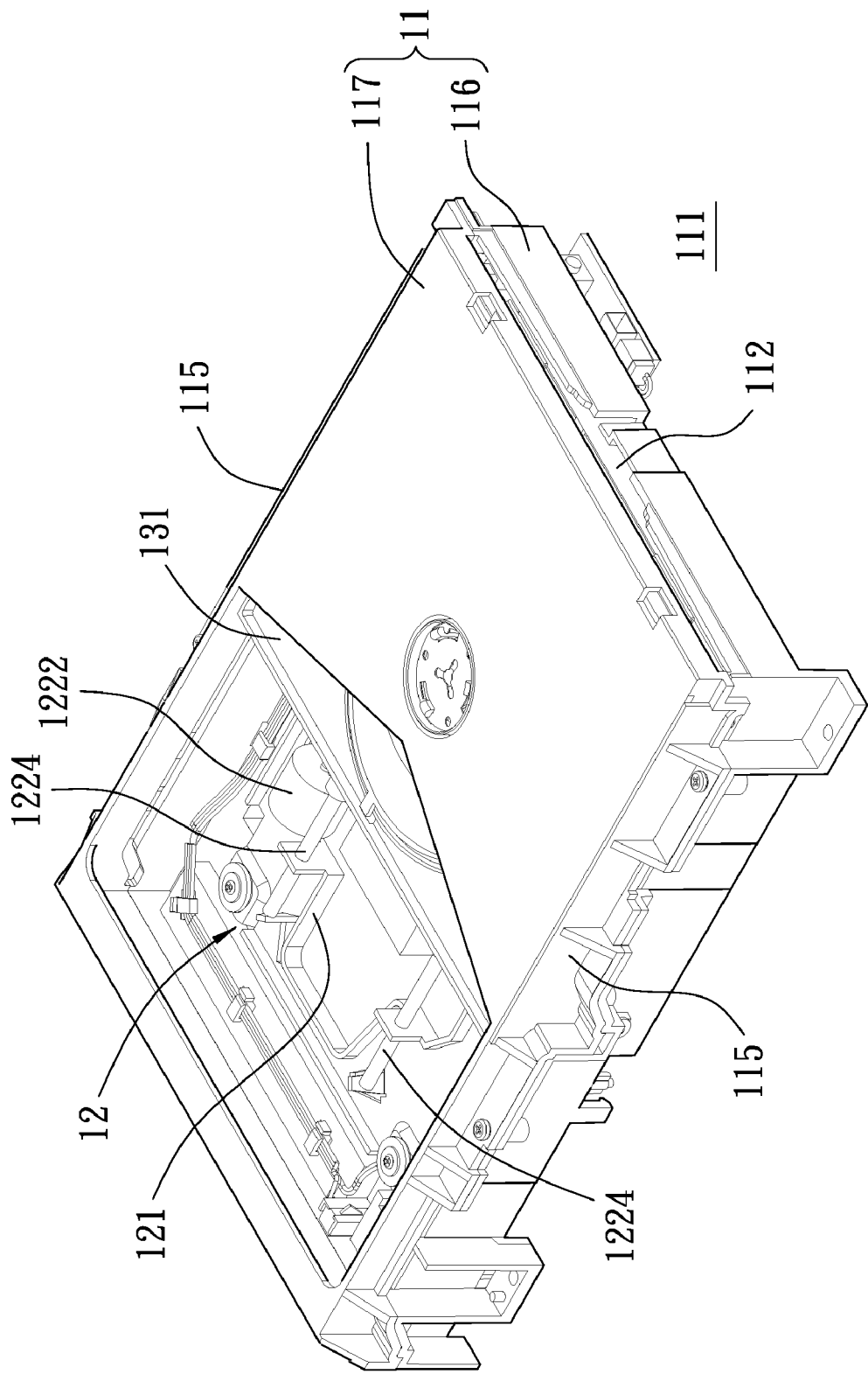
FIG. 2 is a schematic, isometric view of the slot-in optical disk drive according to the embodiment of the present invention, showing a sliding base being adjacent to a disk slotting opening.
Figure 3:
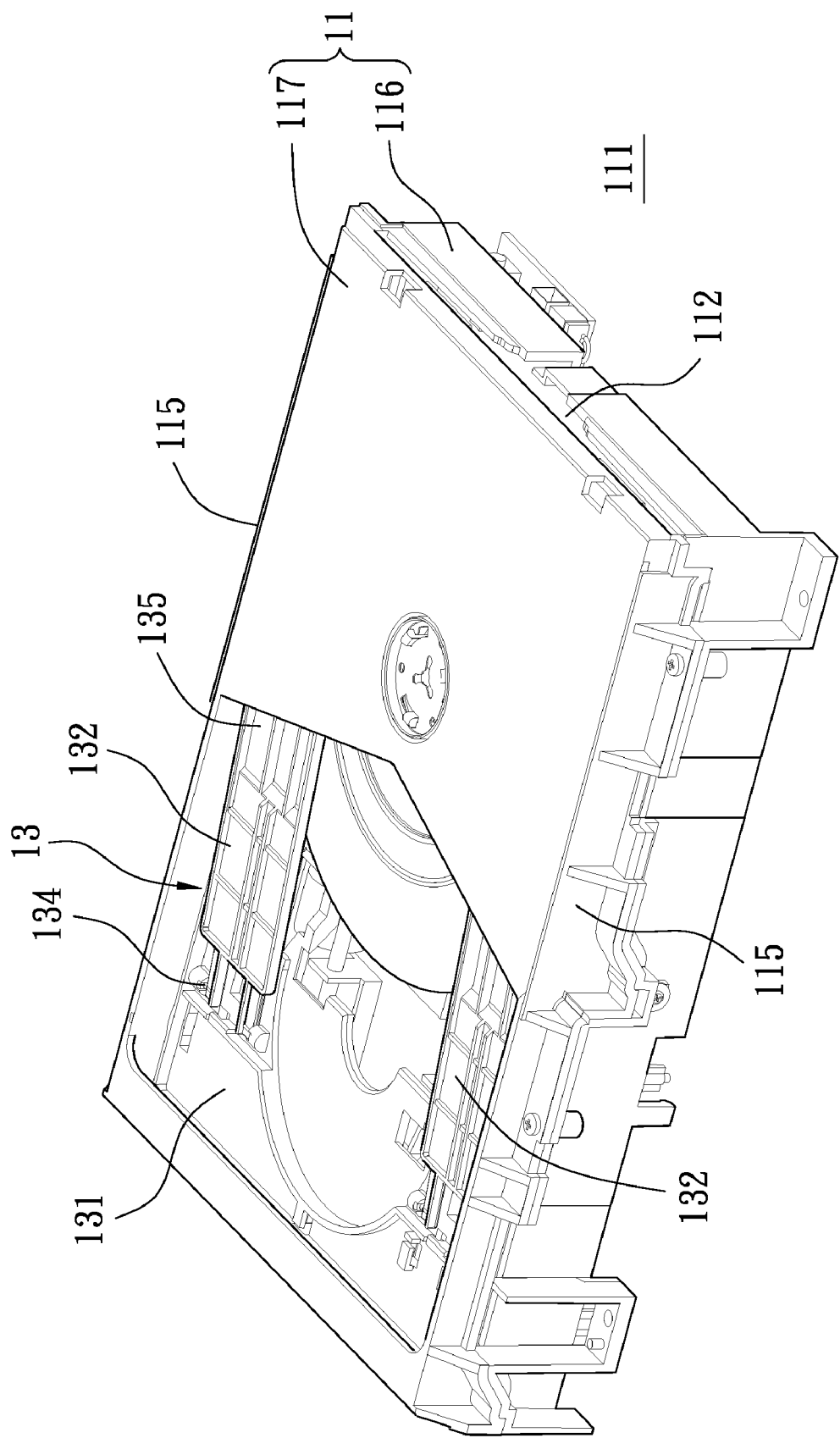
FIG. 3 is a schematic, isometric view of the slot-in optical disk drive according to the embodiment of the present invention, showing the sliding base being at a main body.
Figure 4:
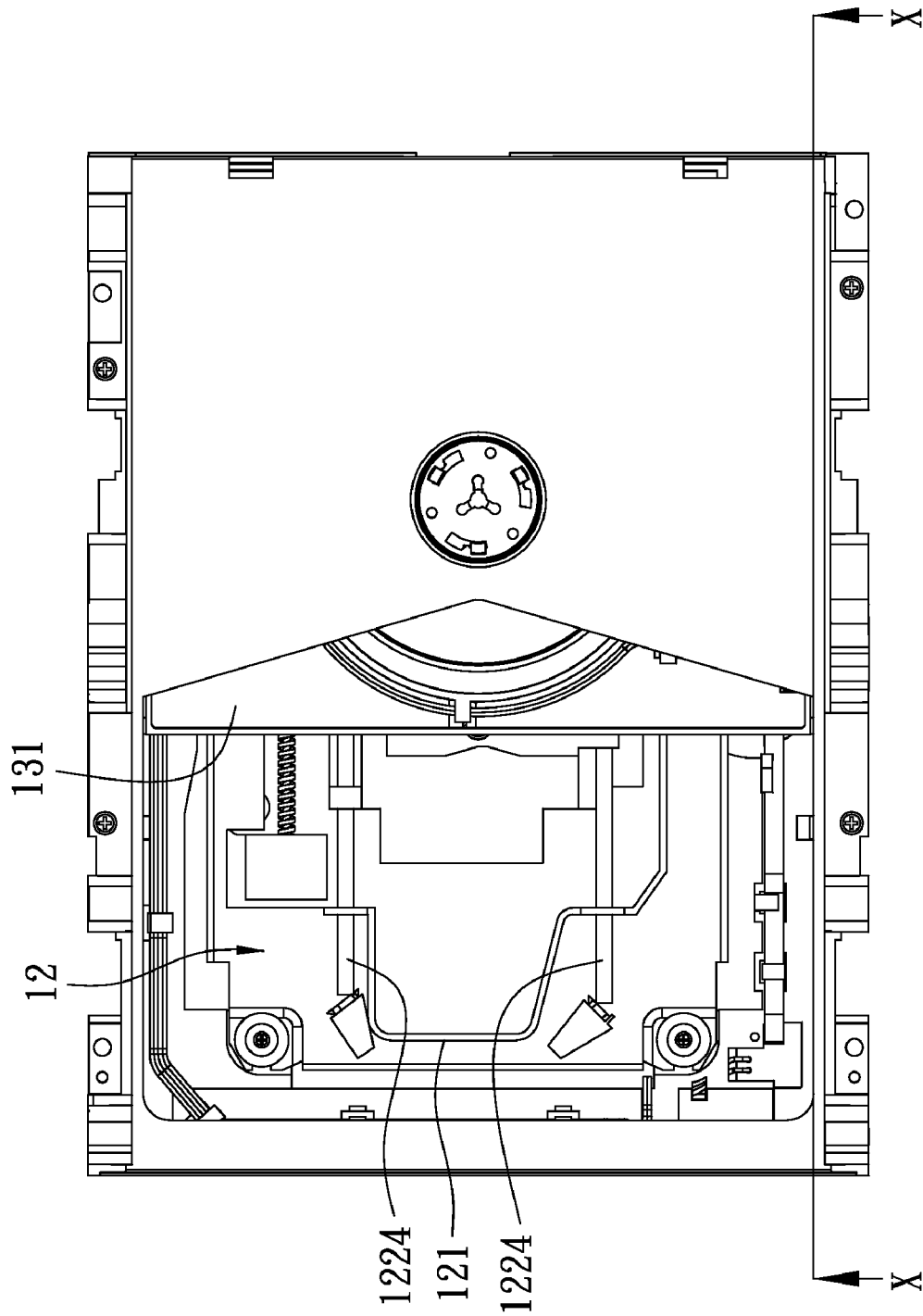
FIG. 4 is a top view of the slot-in optical disk drive of FIG. 2.
Figure 5:
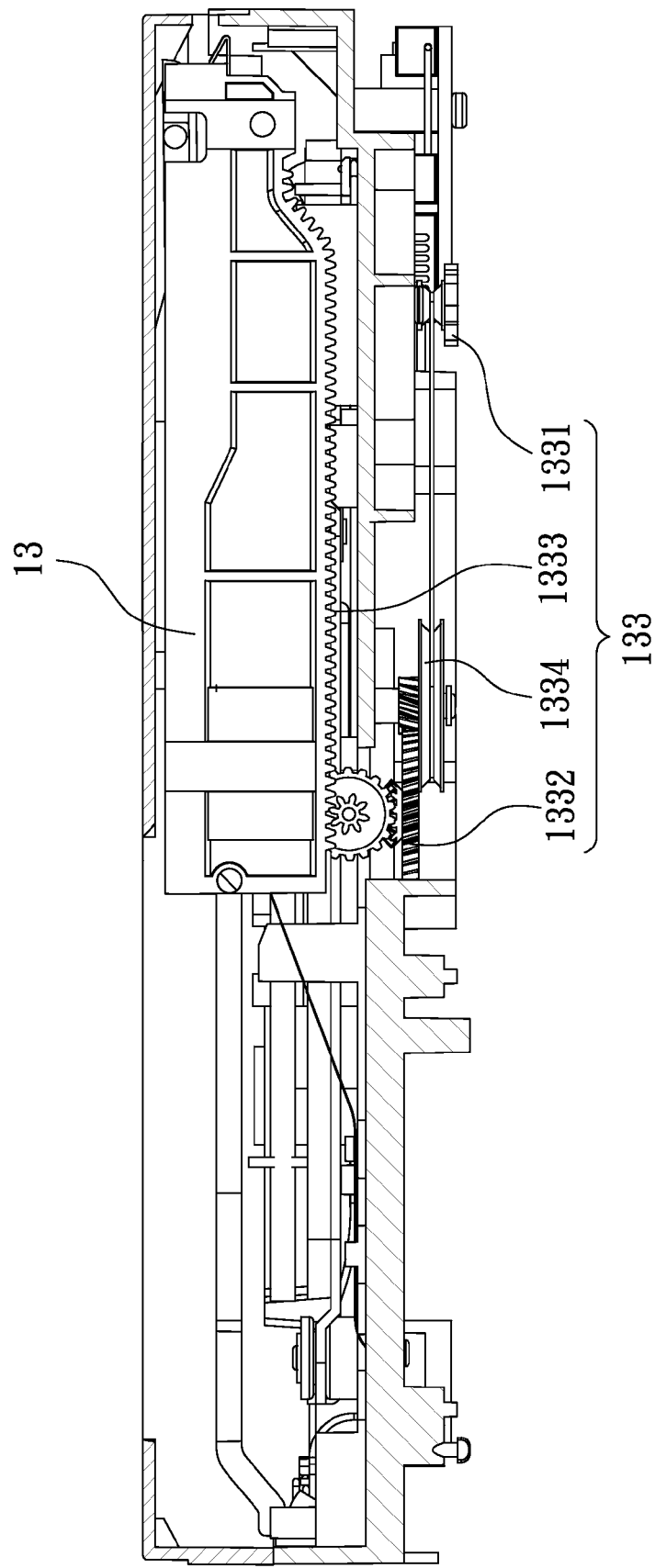
FIG. 5 is a top view of the slot-in optical disk drive of FIG. 4, taken along line X-X thereof.
Figure 6:
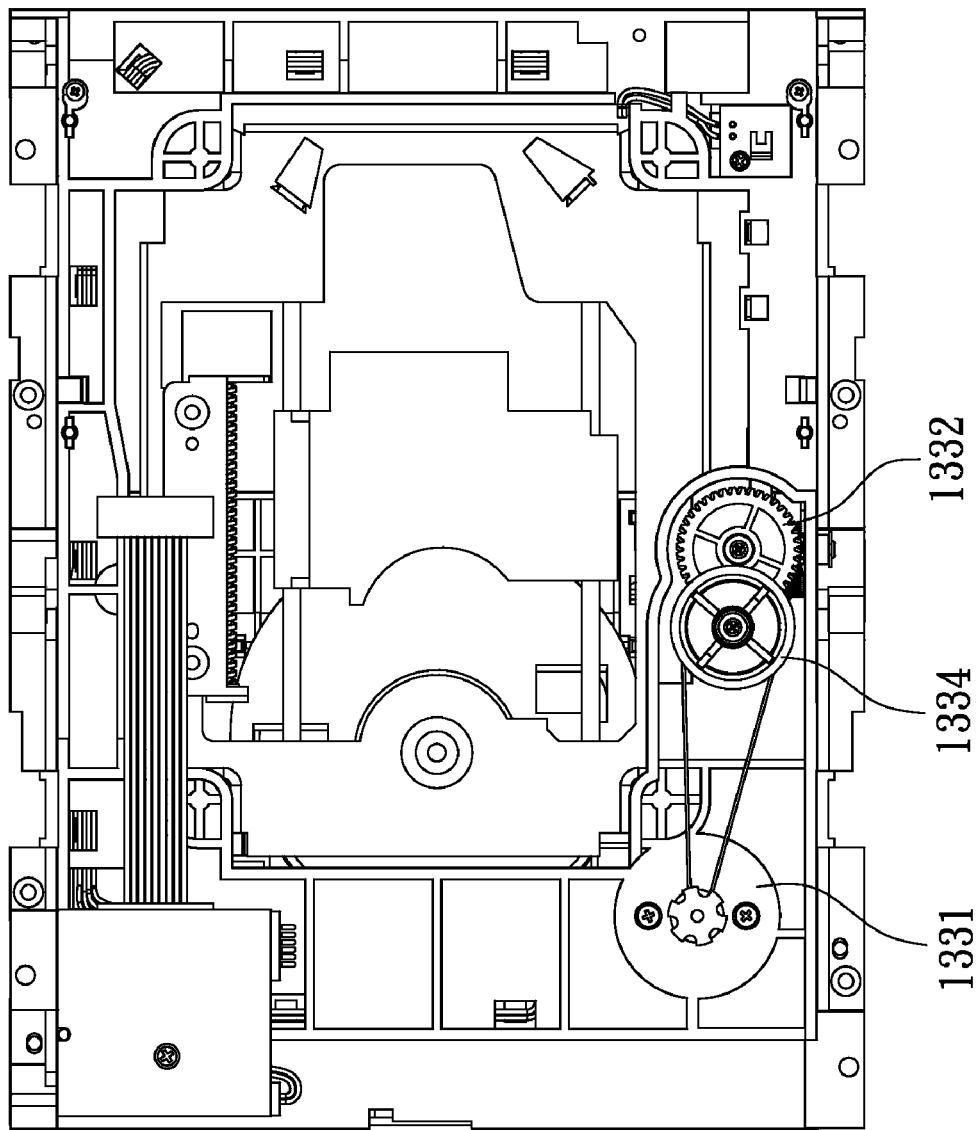
FIG. 6 is a bottom view of the slot-in optical disk drive of FIG. 2.

Also referring to FIGS. 2 and 3, the holding mechanism 11 is mainly used to hold the main body 12 and the sliding module 13. The holding mechanism 11 has a disk slotting opening 112, two sliding rails 113 and two slope rails 114. The disk slotting opening 112 is defined in a front end 111 of the holding mechanism 11. The two sliding rails 113 are located at two inner sidewalls 115 on two sides of the holding mechanism 11 correspondingly. The slope rails 114 are sloped up from ends of the sliding rails 113 correspondingly. In an illustration embodiment of FIG. 1A, the sliding rails 113 are depressed in the inner sidewalls 115 of the holding mechanism 11 correspondingly. In an alternative embodiment, the sliding rails 113 can be protruded out from the inner sidewalls 115 of the holding mechanism 11 correspondingly. In addition, in this embodiment, to manufacture and assembly the holding mechanism 11 easily, the holding mechanism 11 may mainly includes a bottom cover 116 and an upper cover 117.

Referring to FIG. 1 again, the main body 12 mainly includes a shelf 121, a disk reading unit 122 and a main spindle motor 123. The disk reading unit 122 and the main spindle motor 123 are disposed on the shelf 121. The main body 12 is fixed in the holding mechanism 11 by the shelf 121. The disk reading unit 122 includes a laser reading head 1221, a motor 1222, a transmission gear 1223 and a guide-bar unit 1224. A motive power generated by the motor 1222 can be transmitted to the laser reading head 1221 via the transmission gear 1223, so that the laser reading head 1221 can move along the bar unit 1224. In addition, the main spindle motor 123 is used to drive the disk 14 to rotate.

Figure 7:
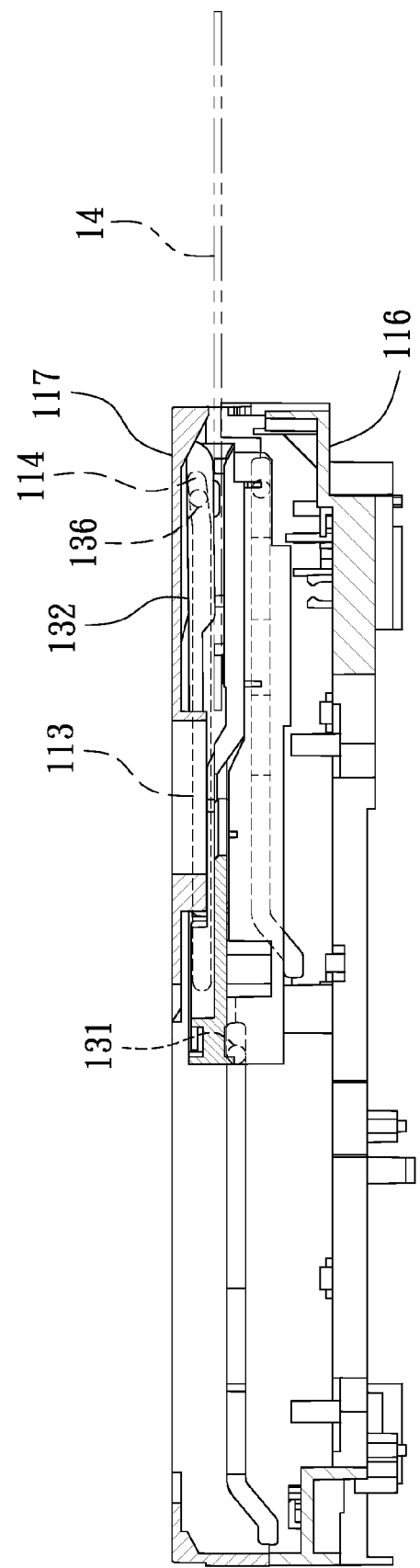
FIG. 7 is a schematic, isometric view of the slot-in optical disk drive according to the embodiment of the present invention, showing the sliding base being adjacent to the disk slotting opening while the slot-in optical disk drive is used.
Figure 8:
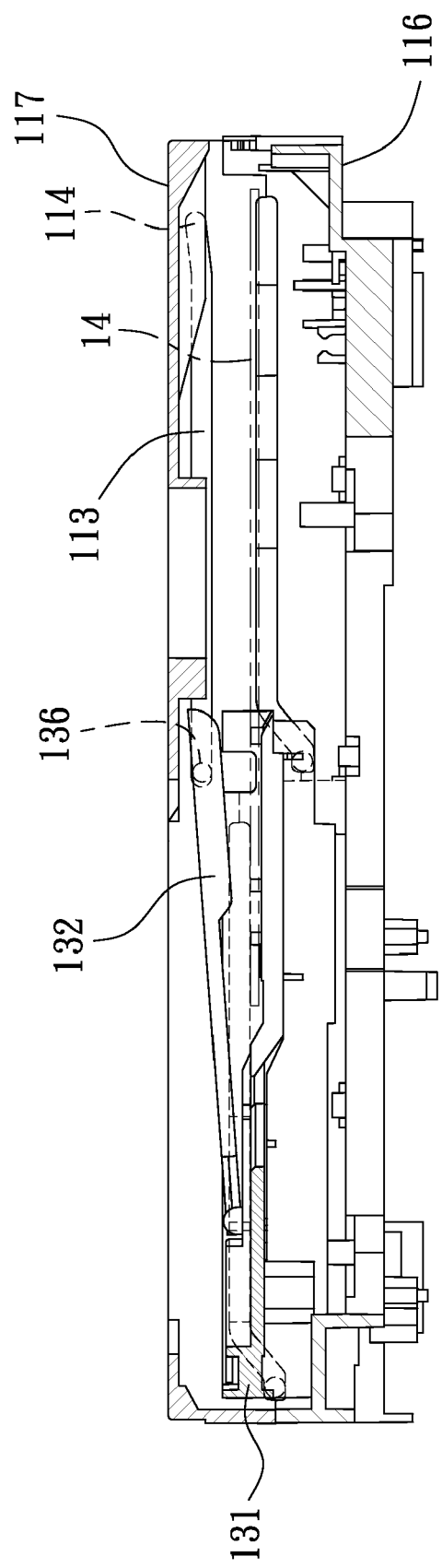
FIG. 8 is a schematic, isometric view of the slot-in optical disk drive according to the embodiment of the present invention, showing the sliding base being at the main body while the slot-in optical disk drive is used.
Figure 9:
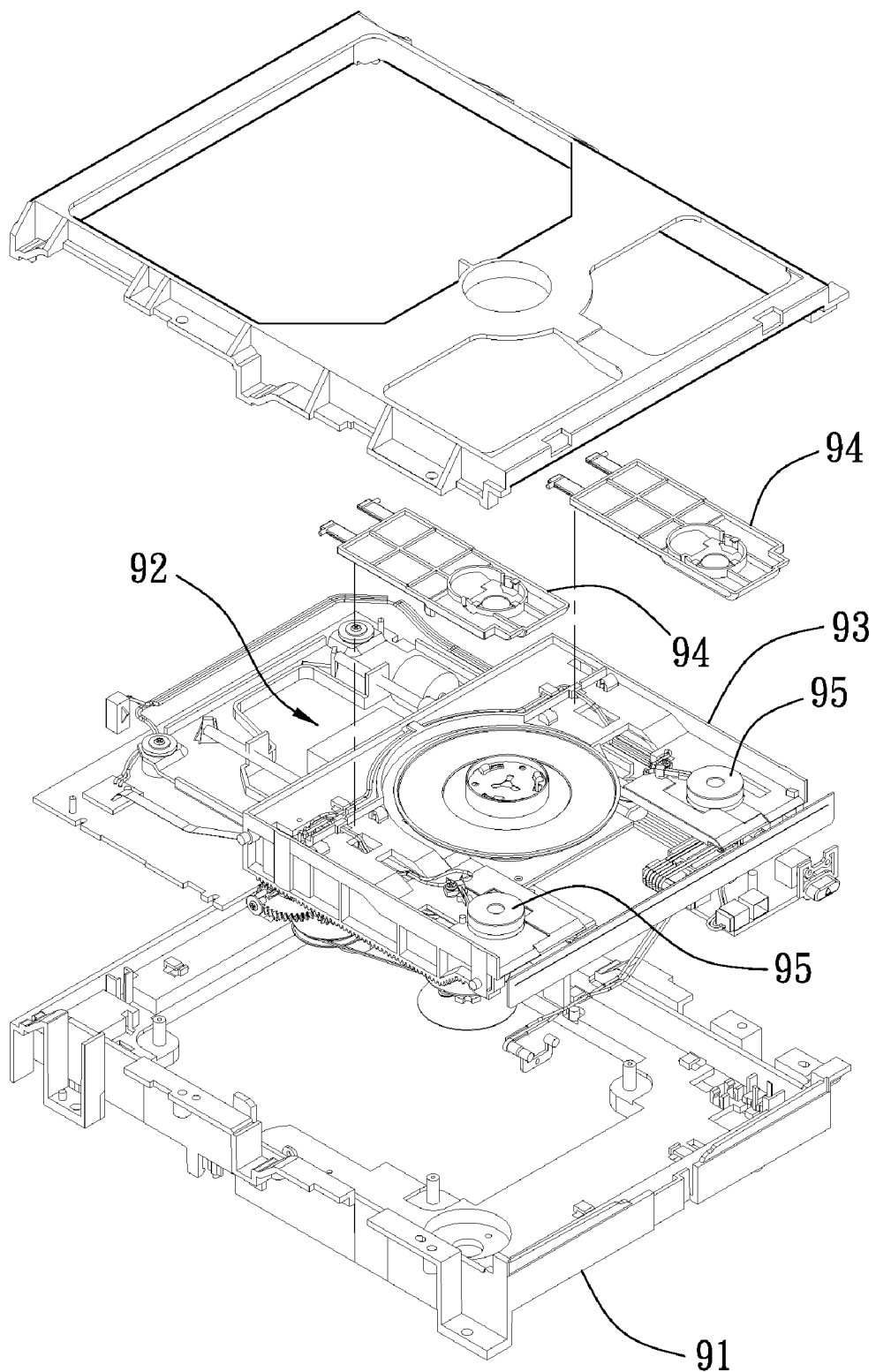
FIG. 9 is a schematic, exploded view of a conventional slot-in optical disk drive.

Referring to FIGS. 1 to 8, the sliding module 13 mainly includes a sliding base 131, two clamp sheets 132 and a driving unit 133. The driving unit 133 is used for moving the sliding base 131. Each clamp sheet 132 has a pivot end 134, a free end 135 and a sliding block 136. The pivot end 134 and the free end 135 are on opposite sides of the clamp sheet 132. The pivot end 134 is rotatably configured on the sliding base 131. The free end 135 faces the disk slotting opening 112. The sliding block 136 is disposed on the free end 135, and the sliding block 136 is movable along the sliding rails 113 and the slope rails 114. If the sliding block 136 is at the sliding rail 113, the free end 135 of the clamp sheet 132 and the sliding base 131 are closed up; and if the sliding block 136 is at the slope rail 114, the free end 135 of the clamp sheet 132 and the sliding base 131 are opened up, as shown in FIG. 7. In other aspects, if the sliding base 131 is moved to make the sliding block 136 of the clamp sheet 132 on the slope rail 114 and make the clamp sheet 132 opened up, the disk 14 can be inserted, and the sliding base 131 can be moved by the driving unit 133 to bring the sliding block 136 of the clamp sheet 132 to move; and in the same time, the clamp sheet 132 and the sliding base 131 will clamp the disk 14 to move into the holding mechanism 11, until the disk 14 gets to a position above the main body 12. On the contrary, if the clamp sheet 132 and the sliding base 131 clamp the disk 14 to move towards the disk slotting opening 112, and the sliding block 136 is moved to the slope rail 114, the clamp sheet 132 and the sliding base 131 will be opened up to release the disk 14, and as such, the disk 14 can be taken out.

In addition, the driving unit 133 includes a motor 1331, a gear set 1332, a gear rack 1333 disposed on the sliding base 131 and a belt pulley 1334. The motive power generated by the motor 1331 can be transmitted to the sliding base 131 via the belt pulley 1334, the gear set 1332 and the gear rack 1333.

In the slot-in optical disk drive of the present invention, the holding mechanism 11 has two sliding rails 113 on the two sides of the holding mechanism 11 correspondingly, each clamp sheet 132 on the sliding base 131 has the sliding block 136 on one side of the clamp sheet 132, and the clamp sheets 132 can be controlled to close up or open up relative to the sliding base 131 to clamp or release the disk 14 correspondingly. Therefore, when compared to the conventional art, a structure of the slot-in optical disk drive of the present invention can be simplified, action of the components of the slot-in optical disk drive of the present invention can be proper and suitable, and cost and power consumption of the slot-in optical disk drive of the present invention can be reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A slot-in optical disk drive, comprising:
   a holding mechanism including a disk slotting opening defined in a front end thereof, two sliding rails at two inner sidewalls on two sides thereof correspondingly, and two slope rails sloped up from ends of the sliding rails correspondingly;
   a main body held by the holding mechanism, the main body including a shelf, a disk reading unit and a main spindle motor, the disk reading unit and the main spindle motor disposed on the shelf, and
   a sliding module held by the holding mechanism, the sliding module including a sliding base, two clamp sheets and a driving unit for moving the sliding base, each clamp sheet having a pivot end, a free end opposite to the pivot end and a sliding block, the pivot end configured on the sliding base rotatably, the free end facing the disk slotting opening, the sliding block disposed on the free end, the sliding block being movable along the sliding rails and the slope rails;
   if the sliding block is at the sliding rail, the free end of the clamp sheet and the sliding base are closed up; and if the sliding block is at the slope rail, the free end of the clamp sheet and the sliding base are opened up.

2. The slot-in optical disk drive as claimed in claim 1, wherein the sliding rails are depressed in the inner sidewalls on the two sides of the holding mechanism correspondingly.

3. The slot-in optical disk drive as claimed in claim 1, wherein the sliding rails are protruded out from the inner sidewalls on the two sides of the holding mechanism correspondingly.

4. The slot-in optical disk drive as claimed in claim 1, wherein the disk reading unit of the main body comprises a reading head, a motor and a transmission gear, and the motor and the transmission gear are used to drive the reading head.

5. The slot-in optical disk drive as claimed in claim 1, wherein the driving unit comprises a motor, a gear set, a belt pulley and a gear rack, the gear rack disposed on the sliding base.

6. The slot-in optical disk drive as claimed in claim 1, wherein the holding mechanism comprises an upper cover and a bottom cover.

* * * * *